Sept. 7, 1943.  L. S. HOLTMEIER  2,328,906
OVERHEAD TROLLEY SYSTEMS
Filed Feb. 3, 1942

Inventor
LOUIS S. HOLTMEIER
By
Alfred F. Dees
Attorney

Patented Sept. 7, 1943

2,328,906

UNITED STATES PATENT OFFICE 2,328,906

OVERHEAD TROLLEY SYSTEM

Louis S. Holtmeier, Cincinnati, Ohio, assignor to The Ohio Brass Company, a corporation of New Jersey Application February 3, 1942, Serial No. 429,417

18 Claims. (Cl. 191—38)

This invention relates to trolley frog pans and in its more specific aspects relates to a means for mechanically shifting the tongue element of a frog pan.

The object of this invention is to construct a trolley frog pan in which the tongue element thereof is selectively mechanically actuated by a lost motion shifting device mechanically controlled by the current collectors of a moving vehicle.

A further object of the invention is to provide a lost motion shifting device actuated by the vehicle current collectors whereby the tongue element is positionally controlled by the turn-off or straight-through position of the vehicle.

A further object of the invention is to provide a cantilever type of tongue shifting device for a trolley switch.

A still further object of invention is to provide a lost motion connection in the linkage of a mechanically actuated device for shifting the tongue of a trolley frog switch by the mechanical action of the current collectors.

Another and still further object of the invention is to construct a trolley pan in which there is a direct mechanical resilient lost motion linkage between the actuator and the tongue element thereof.

Another and still further object of the invention is to construct a trolley switch in which a fewer number of parts is employed to effect a mechanical shifting of the tongue, thereby reducing the cost of manufacture and maintenance and which will be positive in its action.

Other and further objects of the invention will occur to those skilled in the arts to which this invention pertains as the description proceeds which taken in connection with the accompanying drawing sets forth a preferred embodiment thereof but such disclosure is not to be construed as a limitation of the invention which is limited only by the appended claims and any and all modifications, alterations and variations of structure coming within the spirit and scope thereof are deemed to be included herein.

Figure 1:
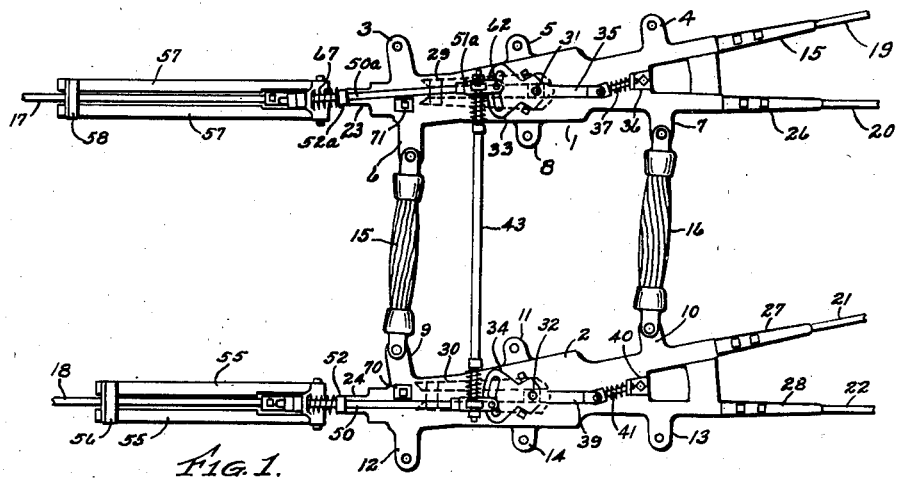
Fig. 1 shows a plan view of the trolley switch having the invention applied thereto.

Many varieties of overhead trolley switching systems have been developed and in various forms and manners whereby trolley cars and trolley buses may have their current collectors follow a predetermined turn-off path when such vehicles desire to depart from a continuous or straight-ahead path of motion. The art contains a variety of said developments of both an electrical and a mechanical nature for shifting the tongue of the trolley frog to either a turn-off path or a straight-ahead path. Some of these devices, as indicated, require that the current collector establish a circuit through some form of electromagnetic device that is adapted to shift the tongue from one position to the other. Other devices of a strictly mechanical nature have been developed, but these on account of more or less cumbersome and involved mechanism have not proved satisfactory. The electrical devices while satisfactory under a variety of conditions, require considerable servicing in order to keep them in operating condition and the constant danger of burn-outs, and have excessively heavy equipment which renders them a more or less costly expedient to effect the shifting of trolley frog tongues or switches. Applicant has, therefore, developed a straight mechanical device for shifting the trolley frog tongues in which the current collector actuates a simple lost motion linkage device that selectively shifts the tongue to either the angular or the straight ahead position and reduces the movable parts to a very few basic and essential elements all of which are readily accessible and require very little, if any, attention to enable the device to render long, continuous and satisfactory service.

The device of the instant invention comprises two pan elements 1 and 2, each of which has associated therewith brackets or ears 3, 4, 5, 6, 7 and 8 on the one pan and elements 9, 10, 11, 12, 13 and 14 on the other pan. These brackets or ears are for the purpose of connecting and suspending pans 1 and 2 a predetermined, spaced distance apart and, also, for the purpose of receiving appropriate cables or supports to suspend the same from a post or other supporting structure. Disposed between two or more of the bracket elements, such as 6, 9 and 7, 10, are strain insulators 15 and 16 more or less of a conventional design, well-known to the arts for maintaining the spacing of the trolley frog elements 1 and 2 and, also, to prevent any possible short-circuiting of the trolleys through the pan elements.

Secured to one end of the trolley frog pans are a pair of trolley wires or conductors 17 and 18, each of which are fastened to the pan elements 1 and 2 by means of clamping elements 23 and 24, which devices are likewise well-known to the arts. On the opposite side of the trolley frog pan are disposed another plurality of trolley wires 19, 20, 21 and 22, which are secured to the clamps 25 and 26, 27 and 28, similar in construction to clamps 23 and 24. It will be observed from inspection of the drawing that conductors 19 and 21 lead off at an angle from the straight through conductors 17 and 18, 20 and 22 for purposes likewise well-known to the art.

Figure 3:
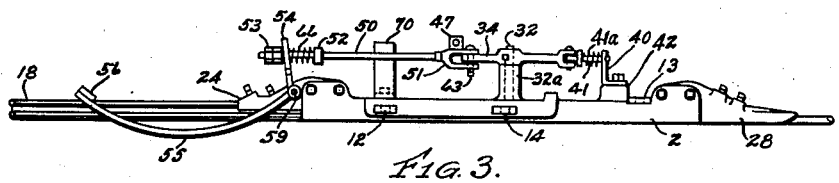
Fig. 3 shows an elevational view thereof.

Each of the pan devices 1 and 2 is equipped with pivotally mounted tongue elements 29 and 30 that are secured and rigidly held on pivots 31 and 32 rotatably supported in a boss or bearing element 32a, it being understood that there is a boss element 32a disposed on each of the pan elements 1 and 2. Connected to the upper end of each of the pivots 31 and 32 are deflector elements 33 and 34 secured to the said pivots 31 and 32 by appropriate set screws or other convenient holding devices. Each of the deflector elements has a tail piece 35 and 39 integrally associated therewith and each are toggle connected to brackets 36 and 40 secured to appropriate bosses 42, as more particularly shown in Fig. 3. The toggle connections comprise rod elements 37 and 41 pivotally connected to the end of the tail pieces 35 and 39 and each has a spring 38 and 41a surrounding the said rod elements interposed between one portion of the brackets 40 and 36 and the head or collar on the rods 37 and 41. The free end of the rods 37 and 41 is relatively slidable in an appropriate aperture in the upright portion of the brackets 36 and 40.

On the opposite ends of the deflector plates 33 and 34 are disposed a pair of rods 50 and 50a, having clevises 51 and 51a and each provided with pins 62 and 63 that pass through slots 60 and 61 formed in the deflector elements 33 and 34. These slots are substantially V-shaped. The apices of the V slots point in the direction of the conductors 17 and 18. Connected between the clevises 51 and 51a is an insulating rod 43 that has threaded metal ends and provided with lock-nuts 46 and 47, the said threaded ends passing through bracket elements 48 and 49 integrally associated with the clevises 51, 51a. Appropriate springs 44 and 45 are disposed between shoulder portions on the rod 43 and the bracket elements 48 and 49 for the purpose of maintaining a proper spacing between rods 50, 50a and, also, to provide for a lost motion connection between the said two deflector elements 33 and 34.

The opposite ends of the rods 50 and 50a have collars 52 and 52a arranged thereon. Rods 50 and 50a pass through apertures in the bracket portions 54 and 54a, said apertures being in substantial alignment with the plane of the deflector plates 33 and 34. Springs 66 and 67 interposed between the said collars 52 and 52a and the brackets 54 and 54a and a pair of nut elements 53 and 53a maintain the relative position of the rods 50 and 50a and the bracket elements 54 as well as for purposes of adjustment. The bracket elements 54 and 54a are adapted to rotate on pivot pins 59 (Fig. 3) secured to clamp elements 23 and 24, there being one of said pivots on each of said clamps and only one disclosed in the drawing. Secured to the brackets 54 and 54a and rotatable about the pivot 59 are pairs of conductor contactor elements 55, 55 which in the instant illustration are in the form of the segment of a circle and to prevent the said contactor elements from dropping below a predetermined plane they are equipped with a bridging element 56 to prevent such excessive relative motion. The trolley wire conductor 17 likewise has its pair of contactor elements, 57, 57 bridged by element 58 which serves the same function as the element 56.

The operation of the device is substantially as follows: Assuming that a vehicle is passing underneath the overhead trolley switching device when it is in the position of Fig. 1, and it is intended to continue straight ahead onto the wires 20 and 22 from the wires 17 and 18. The current collector engageable with conductor 17 will contact the contacting devices 57, 57 and elevate it as the collector passes underneath the same. The upward motion of the contactor 57 will shift the pin element 62 to the end of the upper portion of the slot 60 and simultaneously draw pin 61 to the opposite side of the apex of slot 61. By this time the contactor engageable with conductor 18 will have engaged contactor 55 and both pins will be urged against the upper ends of the respective slots. The rods 50 and 50a will move in a substantially parallel path when rod 43 has drawn rod 50 past the apex 65 of deflector 34. Since tongues 29 and 30 are already in proper position nothing will happen and springs 66 and 67 will absorb the upward motion of contactors 55, 55, 57, 57 after the pins engage the upper end of slots 60 and 61. As soon as the current collectors have passed underneath the contactors they will be returned by gravitational action to their lowermost position and the action of springs 45 and 66 will restore the pin 61 to its original position.

Figure 2:
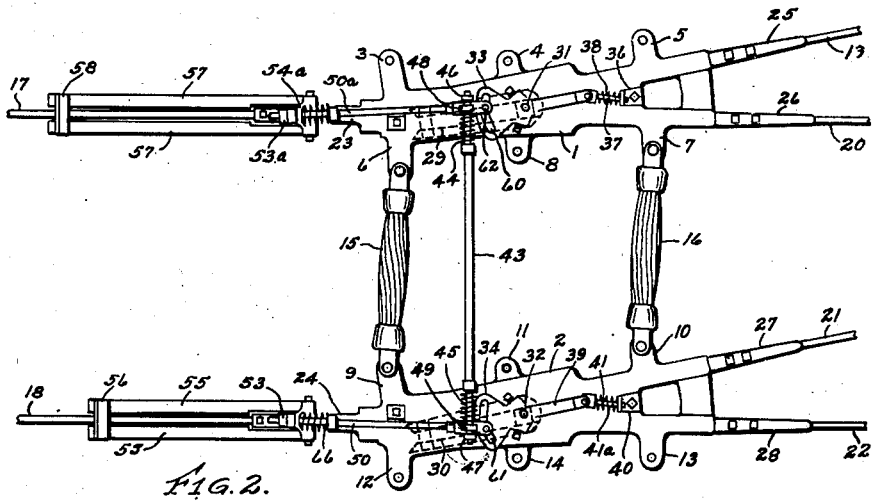
Fig. 2 shows a plan view of the trolley switch having the tongue elements shifted to a different position.

When it is desired by the operator to have the tongue elements 29 and 30 shifted from the straight-through position of Fig. 1 to the turn-off position, as indicated in Fig. 2, he will start to turn his vehicle at the proper point and thereby bring the current collector engageable with conductor 18 into engagement with contact elements 55, 55 before the collector engageable with conductor 17 engages contactors 57, 57. The reason why this particular current collector will first engage the contactors 55, 55 is by reason of the parallelogram formed by the horizontal projection of the trolley poles, the base pivotal points and the current collectors. The contactor elements 55, 55 will be elevated or pivoted about pivot 59 and will then urge the pin 63 to the base or end of the lower portion of the slot 61 under the influence of spring 66. At the same time rod 43 will be axially moved by reason of the nut elements 47 engaging the clevis bracket 49 and draw the rod 50a down below the apex 64 of the slot 60 thereby placing rods 50 and 50a substantially parallel to each other. After this motion has taken place the current collector engageable with conductor 17 will have engaged with contact elements 57, 57 and the upward motion of these elements will urge rod 50a forward under the influence of spring 67 such that pin 62 can go into engagement with the base of the lower portion of slot 60. Continued motion of the vehicle will urge the pins 62 and 63 into engagement with ends or bases of the respective slots and cause the deflector elements 33 and 34 to be rotated about their respective pivots 31 and 32 such that the frog elements 29 and 30 will be brought into alignment with the conductors 19 and 21. The movement of the toggle elements 41, 41a and 37, 38 past their respective center points will serve to lock the trolley tongues in their adjusted position. After the trolley frogs have been shifted to the turn-off position any excess continued upward motion of the contactors 55 and 57 will be taken up by the springs 66 and 67. When the current collectors have passed the contactor elements 55, 55 and 57, 57, they, under gravitational action, will return to the position indicated in Fig. 3 and the action of springs 44, 45, 66 and 67 singly or in combination will restore the pins 62 and 63 to the position, as indicated in Fig. 1 or in Fig. 4 on the diverging sides of the V slots.

When the operator of the vehicle approaching a trolley frog along the path of conductors 17 and 18 wishes to go to the turn-off position and finds the trolley frogs 29 and 30 already in that position, the same motion of rods 50 and 50a will be performed, as described in the immediately preceding paragraph, but since those frog tongues are already in the turn-off position no action will take place other than the pins going into engagement with the base of the lower portions of slots 60 and 61 and after the passage of the vehicle and current collectors, the contactors will be returned to their original position in the manner described.

If the operator of a vehicle approaching the switch from the path of conductors 17 and 18 wishes to continue straight ahead onto the path of conductors 20 and 22 and the tongue elements 29 and 30 are in the turn-off position, as indicated in Fig. 2, then the current collector engageable with conductor 17 will elevate contactors 57, 57 and urge rod 50a axially forward under the influence of spring 67 such that pin 62 will engage the base of the upper portion of slot 60 and simultaneously, axially move rod 43 upward, so as to bring pin 63 up above the apex 65 of slot 61 in deflector 34. Thereafter the current collector engageable with conductor 18 will engage contactors 55, 55 and urge them upwardly against the action of spring 66 to urge rod 50 axially forward such that pin 63 will engage the base of the upper portion of slot 61 and the continued forward motions of rods 50 and 50a will rotate deflector plates 33 and 34 about their pivots 31 and 32, bringing them and tongues 29 and 30 into line with the conductors 20 and 22. The rods 50 and 50a again act in parallel while rotating tongues 29 and 30. The action of the toggle elements 41 and 41a, and 37 and 38 will again retain the frog tongue elements 29 and 30 in their respective adjusted positions. After passage of the vehicle the shifting mechanism will be restored to its original position as described above.

Figure 4:
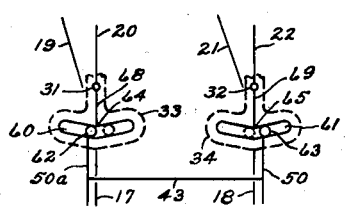
Fig. 4 shows a schematic enlarged detail of the shifting mechanism for the tongue element.

Fig. 4 represents the schematic illustration of the operation of the device in which the tongue elements are designated by numerals 68 and 69 and in which the deflector elements 33 and 34 have the V-slots 60 and 61 disclosed on an enlarged scale with the pivot pins 62 and 63 of the clevises 51 and 51a, said pins 62 and 63 disposed on opposite sides of the apices 64 and 65 of the V-slots and the rod 43 illustrated by means of a simple line to show the cooperation of the parts. When the contactors 55 and 57, whichever one is first engaged, commences its upward motion, it will urge the rods 50 or 50a to the right as viewed in Figs. 1 to 3 or upwardly as in Fig. 4 and since this motion is lineal it will, after the pins 61 and 62 engage the appropriate ends of slots 60 and 61, begin to rotate one or the other deflector elements about the pivots 31 and 32 but before said rotation commences rod 43 will urge pins 62 or 63 above or below the apices 64 or 65 into one or the other dotted line positions such that when both rods 50 and 50a are moved axially and in the same direction they will rotate both deflectors in the same direction. The function of the several spring elements is for the purpose of taking up any excess motion imposed upon the contacts 55 and 57 over and above that which is required to shift the tongue elements 29 and 30. Springs 44 and 45 acting in cooperation with springs 66 and 67 upon the retraction of rods 50 and 50a will always keep pins 62 and 63 on the diverging side of slots 60 and 61. The tongue elements are retained in their adjusted position by means of the toggle elements and springs associated therewith 37, 38, 41, 41a that are displaced from side to side of the relative centers of the pivots 31 and 32 and the bracket elements 36, 40 to thereby hold the deflectors in any of the two selected positions.

In the event the action of springs 66 and 67 following operation of the device is not sufficient to bring the pins 62 and 63 on the diverging sides of the slots 60 and 61 a pair of auxiliary leaf springs 70 and 71 appropriately secured to the pans 1 and 2 may be provided. These act against the rods 50 and 50a to diverge them. The limiting of the diverging movement of the rods 50 and 50a is controlled by the action of nuts 46 and 47 on rod 43. The springs 44 and 45, complement each other and act in conjunction with springs 66 and 67. In either event nuts 46 and 47 function as stops. The combined action of the springs is intended to restore the pins to the full line positions of Fig. 4. Springs 44 and 45 are capable of acting alone in conjunction with 66 and 67 to restore the pins 62 and 63 to their initial position but may be supplemented by springs 70 and 71 in the event of necessity.

From the above it is apparent that a mechanical device has been provided in which the action of the upward motion of the contactors induced by the current collectors on the said contactors will mechanically cause the tongue elements 29 and 30 to be adjusted to either a straight through or the turn-off position.

That which is regarded new, novel and useful and which is desired to be protected by Letters Patent of the United States is as follows:

1. In an overhead trolley system; a pair of frog pans; a conductor connected to one end of each of said pans and a pair of conductors connected to the other end of each of said pans; a pin pivotally mounted in each of said pans; a tongue associated with one end of each of said pins and selectively movable to connect same with either of said pairs of conductors; a deflector connected to the other end of each of said pins and having a V shaped slot therein whose apex points in the direction of each of said first mentioned conductors; a pair of clevised rods having pins therein, said pins slidable in said slots and normally disposed on the diverging sides of said slots; a contactor element pivotally mounted on each of said pans and extending over said conductors; means connecting said contactors and said rods, including a lost motion connection; means connecting said rods to shift one of said clevis pins to the opposite side of the apex of one of said slots; said contactors shifting said tongues when vertically moved and means to hold said tongues in shifted position.

2. In an overhead trolley system; a pair of pans in spaced relationship; a single conductor connected to one end of each of said pans; a pair of conductors connected to the opposite end of said pans; a pin rotatably mounted in each pan; a tongue secured to one end of each of said pins; a deflector plate secured to the other end of each of said pins and having a V slot in each plate whose apex extends towards said single conductors; clevises associated with said slots having pins disposed on the diverging sides of said V slots; rods connected to said clevises; contactors and bracket mechanisms pivotally connected to each of said pans, said contactors adapted for vertical movement relative to said pans; said rods slidable with respect to said brackets and contactors and having a lost motion connection therewith; means transversely connecting said rods; said contactors upon vertical movement axially moving said rods to rotate said tongues to selectively align same with either of said pairs of conductors.

3. In a trolley frog shifting mechanism; a pair of pans held in spaced relation; pin connected tongue and deflector elements rotatably mounted on each of said pans; means to shift said deflectors to rotate said pins and tongues relative to said pans, including pivoted contactor means associated with said pans and rod means connecting said deflectors and said contactor means; means transversely connecting said rod means; and said contactor means and said deflector means being so constructed and arranged such that said tongues will be selectively shifted depending upon which of said contactors is first lifted.

4. In an overhead trolley switch system; a pair of pans held in spaced relationship; pivotally mounted tongue and deflector elements on each of said pans; a conductor connected to one end of each of said pans; contactor elements pivotally connected to said pans and movable vertically with respect to said conductors; and means connecting each of said deflectors and said contactors; a lost motion connection connecting said rods and said contactors; said deflectors having V slots therein pointing in the direction of said conductors; means associating said rods with said slots; means to maintain said rods on diverging sides of said slots including a transverse rod connecting said rods and spring elements on said transverse rod to keep said rods diverged; means to restore said rods to diverged condition after operation and toggle means to keep said tongues and deflectors in adjusted position.

5. In an overhead trolley system; a pair of pans held in spaced relationship; tongue and deflector plate elements pivotally associated on each pan and adapted to pivot in unison; conductors connected to one end of said pans; contactor elements pivoted to said pans and movable vertically with respect to said conductors; bracket elements on said contactors; rod means associated with each of said brackets; clevises on each of said rods engageable in V slots formed in said deflectors; a lost motion connection associating said rods and said brackets; a transverse rod connecting said rods and slidable with respect thereto; spring means to keep said rods on the diverging sides of said V slots; means to limit the diverging motion of said rods; toggle means to keep said deflectors and tongues in adjusted position; said contactors when moved selectively upwardly moving said rods into substantially parallel relation and upon forward motion of said rods by continued upward motion of said contactors shifting said tongues; and means to restore said rods to their diverging relationship.

6. In an overhead trolley system; a pair of pans; means to hold same in a spaced relationship; a conductor connected to one end of each of said pans; a tongue and deflector plate operatively connected together and mounted for pivotal motion on each of said pans; a contactor element pivotally mounted on each of said pans for vertical movement with respect to said conductors; each of said deflector plates having a V slot therein whose apex points in the direction of said conductors; a clevis and pin associated with each of said slots; rod means connecting each of said contactors with each of said clevises including a lost motion spring connection associating said contactors with said rods; and means to normally maintain said clevises on the diverging sides of said V slots.

7. In an overhead trolley system; a pair of pan elements supported in spaced relationship; a conductor connected to one end of each of said pans; a pivot pin rotatably associated with each of said pans; a deflector and tongue element fixed to each of said pins in each of said pans; a contactor element pivotally associated with each of said pans; a pair of conductors fixed to the other end of each of said pans; means connecting each of said contactors with its corresponding deflector; and a transverse rod connected between said means to keep same in a predetermined spaced relationship; said deflector and tongue elements pivoting on said pans when said contactors are selectively vertically moved to present said tongue elements to one or the other wires of said pans of conductors.

8. In a trolley switching assembly; a pair of pan elements; pivotally mounted shifting means thereon including tongue and deflector elements shiftable in a horizontal plane; contactor elements fixed to each of said pans and adapted to move in a vertical plane; means connecting each of said contactor elements with one of said tongue and deflector elements; transverse means connecting each of said last mentioned means; said tongue, transverse connecting means and deflector elements being so constructed and arranged such that upon a preselected order of vertical movement of said contactors said tongue and deflector elements will be adjusted to a predetermined position.

9. In a trolley switching system; a pair of pan elements held in predetermined spaced relationship having a conductor connected to one end of each of said pans; deflector and tongue elements pivotally mounted on each of said pans; a pivotally mounted contactor on each of said pans adapted for vertical movement with respect to said conductors; rod means connecting each of said contactors with its corresponding deflector; a lost motion connection associating said rod means with said contactors; a transverse means connecting said rods and having means thereon to maintain said rods in a diverging relationship; and said lost motion connection including a spring means to provide a predetermined relative motion between said deflectors and said contactors; said deflectors and tongues shiftable to a predetermined position upon a selected order of vertical movement of each of said contactor elements.

10. In a trolley switching system; a pair of trolley frog pans; deflector and tongue assemblies pivotally mounted on each pan; a conductor connected to each of said pans; a contactor element pivoted to each of said pans; said deflector elements having V slots therein whose apices extend in the direction of said conductors; clevis means associated with each of said slots and normally disposed on the diverging sides of each of said slots; rod means extending from each of said contactors to its corresponding clevis means and connected to each of said contactors by a lost motion connection; a transverse rod extending between said rods; means to maintain said clevis means on said diverging sides of said V slots; toggle means to normally maintain said tongues in adjusted position; and said transverse rod adapted upon the upward motion of a selected contactor adapted to place said clevises on the same sides of said V slot such that upon upward motion of said contactors said tongue and deflector assemblies will be shifted to an adjusted position.

11. In a trolley switching mechanism; a pair of frog pans; deflectors pivotally mounted on each of said pans; each of said deflectors provided with a V slot; conductors connected to one end of said pan; said V slots pointing in the direction of said conductors; pin and clevis means disposed in said slots and normally disposed on the diverging sides of said slots; a contactor vertically movable with respect to said conductor on each of said pans; means connecting said contactors and said clevises; means extending between said clevises, and adapted upon a vertical movement of a selected contactor to draw the other clevis to the opposite side of its V slot and upon continued upward movement of said contactors to rotate said deflectors; and means to restore said clevises to the diverging sides of said V slots when said contactors have been gravitationally returned to their original position.

12. In an overhead trolley switch; a pair of pan elements; a switch element on each pan; a deflector associated with each switch element and having a V slot therein; a conductor connected to one end of each of said pans; a contactor on each of said pans and vertically movable with respect to said conductors; clevis and pin elements associated with each of said slots; means connecting said clevises and said contactors; a transverse rod connecting each of said clevises and adapted upon vertical movement of one of said contactors to draw said other clevis to the same side of its V slot as that of the other clevis, whereupon upward movement of both contactors will shift said switch element to a predetermined position; said contactors being gravitationally returned to their original position and means to restore said clevises to their original position on the diverging sides of said slots when said contactors have been returned to their original position.

13. In a trolley frog switching device; a pair of pan elements; switch means associated with each pan; a contactor on each pan adapted for vertical movement; means connecting each of said contactors with its associated pan switch; means controlled by one of said contactors to shift both of said switches to the same position; and means to restore said last mentioned means to their original position when said contactors have been gravitationally restored to their original position.

14. In a device as defined in claim 13, which includes means to hold said switch means in adjusted position.

15. In a trolley frog shifting mechanism; a pair of pans held in a spaced relationship; a pin rotatably mounted in each pan and having a deflector and tongue element fixed thereto; means to shift said deflectors to thereby rotate said tongues and pins relative to said pans which includes a pivoted contactor associated with each of said pans and means connecting said contactors and said deflectors; means transversely connecting each of said last mentioned means; and said contactors and said deflectors being so disposed and arranged such that said tongues will be selectively shifted depending upon which of said contactors is first lifted.

16. In an overhead trolley system; a pair of pan elements supported in spaced relationship; a conductor connected to each of said pans; a tongue and deflector on each pan element and pivotable thereon about a common axis; a contactor element pivotably mounted on each pan and movable in a vertical plane; a first means connecting said contactor and said deflector on each pan; a second means extending between said first means to maintain same in a predetermined spaced relationship; and said contactors when selectively pivoted upwardly axially moving said first mentioned means and shifting said deflector and tongue elements after said second means has properly spaced said first means with respect to said deflector.

17. In a trolley frog switching device; a pair of pan elements; shiftable elements associated with each pan; a contactor pivotally associated with each pan; means mechanically associating each of said contactors with its corresponding shiftable element; means controlled by one of said contactors to shift both of said shiftable elements to the same position; and means to restore said last mentioned means to their original position when said contactors have been restored to their original position.

18. In a trolley switch shifting mechanism; a pair of pan elements held in spaced relationship; tongue and deflector elements pivotally mounted on each pan; means to shift said deflectors and simultaneously shift said tongues relative to said pans, including pivoted contactor means on each of said pans and means connecting said contactors and said deflectors; rod means connecting said means connecting said contactors and said deflectors; and said parts being associated such that said tongues will be selectively shifted depending upon which of said contactors is first pivoted.

LOUIS S. HOLTMEIER.